J. DARBY.
MOTION PICTURE PROJECTING MACHINE.
APPLICATION FILED MAR. 1, 1918.

1,366,363.

Patented Jan. 25, 1921.
8 SHEETS—SHEET 1.

Fig. 1.

Witnesses,

Inventor
John Darby

J. DARBY.
MOTION PICTURE PROJECTING MACHINE.
APPLICATION FILED MAR. 1, 1918.

1,366,363.

Patented Jan. 25, 1921.
8 SHEETS—SHEET 5.

Witnesses.
E. J. Pickardt.
Hermann ...

Inventor
John Darby

J. DARBY.
MOTION PICTURE PROJECTING MACHINE.
APPLICATION FILED MAR. 1, 1918.

1,366,363.

Patented Jan. 25, 1921.
8 SHEETS—SHEET 7.

Witnesses:

Inventor
John Darby

UNITED STATES PATENT OFFICE.

JOHN DARBY, OF SUMMIT, NEW JERSEY, ASSIGNOR OF ONE-HALF TO EDWIN F. FLINDELL, OF SUMMIT, NEW JERSEY.

MOTION-PICTURE-PROJECTING MACHINE.

1,366,363. Specification of Letters Patent. Patented Jan. 25, 1921.

Application filed March 1, 1918. Serial No. 219,752.

*To all whom it may concern:*

Be it known that I, JOHN DARBY, a citizen of the United States, residing at Summit, in the county of Union and State of New Jersey, have invented certain new and useful Improvements in Motion-Picture-Projecting Machines, of which the following is a specification.

The invention relates to moving picture machines, and more especially to machines which are automatic in their operation, that is, a machine which when started, will pass through repeated cycles of projecting, stopping, reversing and rewinding a film strip, until any predetermined number of such cycles have been accomplished, when the machine will automatically cease operation.

The objects of the invention are to provide such an automatic motion picture projecting machine using a film strip, which will unwind the film from a feed reel, project and wind the film upon a takeup reel, reverse and rewind the film from the takeup reel upon the feed reel; and which during the forward or projecting movement will project intermittently, that is for example, will project for a period, cease projecting and again project, the ratio of projecting time and still time being settable, the intermittent projection to continue until the film roll is unwound to any predetermined point, when the machine will reverse and rewind continuously, again reverse and start another cycle of projection.

When used as an advertising medium, such a machine with alternate periods of projection and rest, would provide time during the rest periods for the dispersal of the onlookers before another period of projection starts.

Other objects of the invention are to provide a continuously rotating driving source, either in what will be termed a forward or reverse direction of rotation, means for automatically changing the direction of rotation of the driving source, governed by the unwinding of the film from either the feed or takeup reel, means for providing a source of light in harmony with the periods of projection of the film strip, and cutting out the light during the rewinding of the film strip, means for framing the picture in the aperture plate, means for relieving the tension on the film strip, during the movement from the projection of one picture to the next succeeding picture of the film strip, means for centralizing and flattening the film in its passage past the aperture plate, means for stopping the driving source in case of breakage of the film strip, means for effecting a predetermined number of cycles of projection of the film strip, and means for stopping the driving source when such predetermined number of cycles have been completed.

These and other objects and advantages will be set forth in part hereinafter, and in part will be obvious herefrom, such objects and advantages being obtained by the instrumentalities pointed out in the accompanying claims.

The invention consists in the novel parts, constructions, arrangements, combinations and improvements herein shown and described.

Generally speaking, the machine proper and its accompanying driving and control mechanisms, may be assembled in any convenient form of housing, such as comprised by the casing 1, subdivided into the upper or feed reel compartment 2, the lower or takeup reel compartment 3, central or machine compartment 4, driving and control compartment 5, and a battery or rheostat compartment 6.

Such a housing would preferably be constructed in a fire resisting manner, either by lining a wooden case with a suitable fire resisting material or by making the case of sheet metal; suitable doors or openings, not shown, being provided to the various compartments for access to the different parts of the machine for inspection and repair.

Referring to Figs. 1, 2, 3 and 4, the film traveling mechanism, so far as regards many features of the invention, may be of any approved and desired form, and as shown herein the film supply is carried upon a feed reel 7, rotating with a shaft 8, supported in a bearing standard 9; the film strip X is drawn downward continuously during projection, by suitable devices such as the sprocket roller 10, the teeth of which engage with a series of perforations in the edges of the film strip, in the usual well known manner. Suitable guiding rollers 11, 12 and 13 assist in maintaining the film in contact with the sprocket 10, and guide the film to the aperture plate 14.

Suitable means for giving the intermittent feed to the film strip X past the aperture plate 14 are provided, such as an intermittently moving sprocket roller 15 driven as hereinafter described.

Suitable relieving tension means for maintaining the film flat against the aperture plate 14, during the period of exposure, and releasing the tension during the period of change, are provided as hereinafter set forth.

Means for uniformly winding the film are likewise provided of any suitable form, and as shown include a uniformly moving sprocket roller 16, and a takeup reel 17, mounted on shaft 18, supported in bearing standard 19, and driven, during the projection of the film strip, by the belt 81.

Suitable guide rollers 21, 22 and 23 are provided, to maintain the film X in contact with the intermittent roller 15 and the uniformly moving roller 16, and to guide the film to the reel 17.

Suitable choke rolls 24, 25 and 26, 27 act as guide rolls between compartments 2 and 4 and compartments 4 and 3 respectively, and serve as a fire stop in the well known manner, in case the film becomes ignited in compartment 4. The choke rolls above referred to, also serve to shut down the machine in case of breakage of the film by fire or otherwise, as hereinafter set forth.

Suitable means are provided for coöperating with a source of light, contained in the lamp house 28, to project the picture in a magnified form upon the screen, and in the embodied form of such means, condensing lenses are provided in the tube 29 of the lamp house 28, and an aperture 14' in the plate 14, in which aperture the successive pictures of the film X are successively framed or registered for a brief instant, in the well known manner; the film X being intermittently fed past said aperture the distance of a single picture at a time. In front of aperture plate 14 is a lens tube 30 provided with suitable projecting lenses.

In front of the lens tube 30 moves a shutter 31, adapted to pass the light when the picture is stationary in the aperture 14' and to obscure the light during the movement of the film in front of said aperture. Said shutter may be of any approved form and may operate in the usual manner, and is shown herein carried upon the shaft 32 rotating in proper time relation with the film traveling mechanism.

Figure 4:
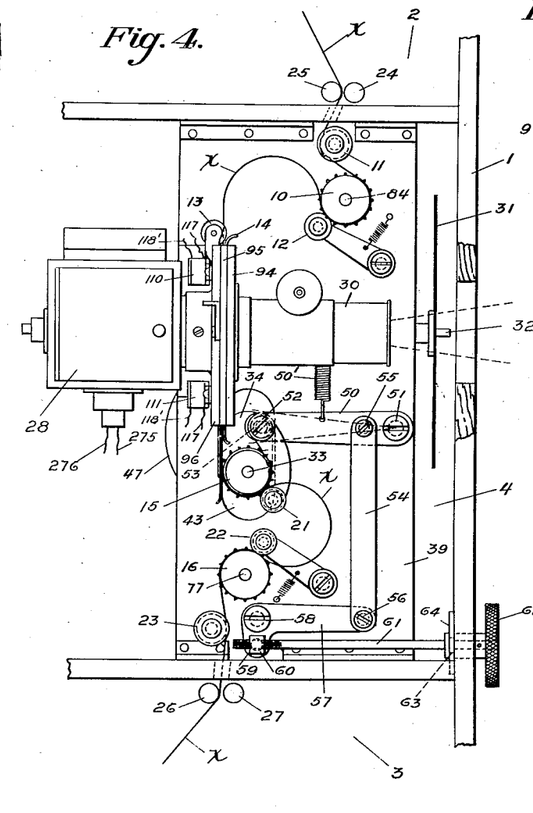
Fig. 4. is an elevation of the machine showing the film feeding and intermittent sprockets, lamp house, aperture plate, tension and framing means, projecting lens, and diagrammatically the choke rolls.
Figures 5, 6:
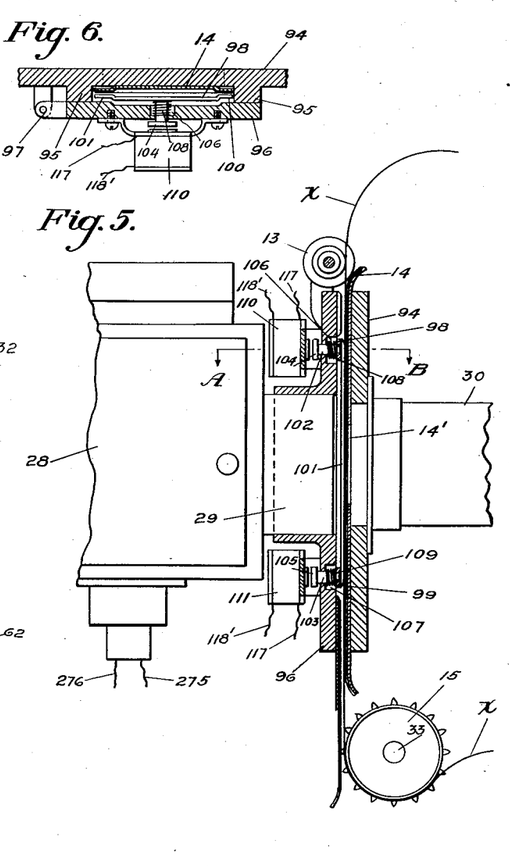
Fig. 5. is an enlarged elevation, partly in section, showing the lamp house, gate, aperture plate and automatic tension.
Fig. 6. is a section on line A. B. of Fig. 5.
Figure 7:
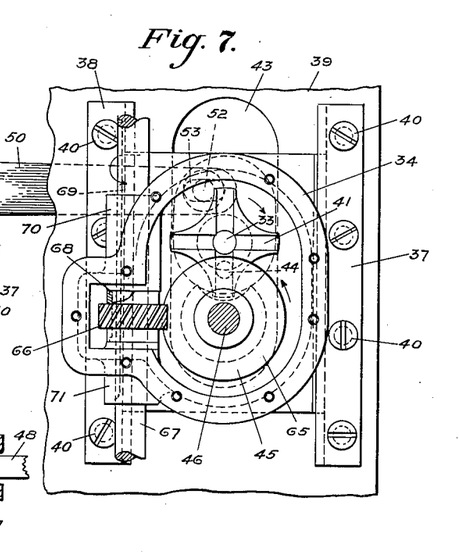
Fig. 7. is an elevation of the intermittent movement in its housing with cover plate removed, showing the driving means for the vertical shaft and a part of the framing means.
Figure 8:
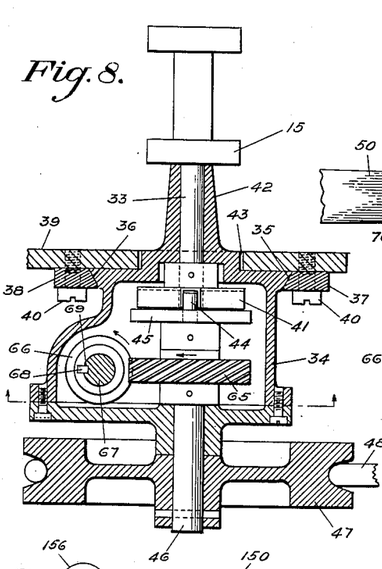
Fig. 8. is a sectional view of Fig. 7. showing the driving means for the intermittent sprocket and the vertical shaft.

Referring particularly to Figs. 4, 7 and 8, the intermittent movement for the sprocket 15 on shaft 33, is comprised in the well known star, cam and pin movement, mounted in an inclosed case 34 adapted to move in the direction of travel of the film strip X. Case 34 is provided with suitable guides 35, 36, engaging gibs 37 and 38, secured to the machine frame 39 by screws 40, 40. Shaft 33 carrying intermittent sprocket 15 and star 41, is supported in a suitable bearing 42 of the movable case 34, and an opening 43 is provided in frame 39 to admit of the movement of said bearing. Pin 44 carried by the disk and cam 45, mounted on driving shaft 46 rotatively supported in suitable bearings in the case 34, transmits intermittently movement to the star 41 in the well known manner.

Fixed to shaft 46, outside the casing 34, is the combined fly wheel and pulley 47, driven by the flexible belt 48 from the motor 49.

Means for imparting movement to the case 34, and with it the intermittent sprocket 15, in the direction of travel of the film X, to frame a picture in the aperture 14' is provided, and as embodied in Figs. 4 and 7 consists of a lever 50, pivoted at one end to the frame member 39 at 51, and at the opposite end flexibly connected to the case 34, by the pin 52 engaging the slot 53 in said lever 50; a link 54 pivoted at one end to lever 50 at 55, connects pivotally at its other end 56, to one arm of a bell crank lever 57, pivoted at 58 to the frame member 39. The other arm 59 of lever 57 extends downwardly and carries a pivotedly mounted block or nut 60, which engages a thread on the rod 61, the other end of said rod having pinned or otherwise secured to it, a knurled head 62 provided on its shank with a groove 63 engaging the plate 64 fixed to the casing 1. A tension spring 50', may be utilized to counterbalance the weight of all the moving parts, and to take up lost motion in the link and lever connections.

It will be obvious, that by a comparatively small rotative movement of the head 62 in either direction, a considerable movement, due to the multiplication of leverages, will be imparted to the case 34, and through it to the intermittent sprocket 15 and the film X in line with its path of travel past the aperture plate 14, and that a picture may readily be brought to register in the aperture 14'.

It will be understood, that as there are no gears interposed between the driving means and the intermittent sprocket, there will be no lost motion or backlash to be taken up when the machine reverses, and consequently the wear on the intermittently moving parts will be reduced to a minimum.

Suitable means are provided to drive the continuously moving sprockets 10 and 16, the feed and takeup reels 7 and 17, and the interrupting shutter 31, and as embodied are comprised of the helical gear 65 secured to shaft 46 and engaging helical gear 66 slidably mounted on, but fixed to rotate with shaft 67, by means of a key 68 fixed in said gear 66 and sliding in the groove 69 provided in said shaft 67.

Bearings 70 and 71 of movable case 34 slide on shaft 67, as said case is moved upwardly or downwardly, the inner faces of said bearings engaging the upper and lower faces of the hub of gear 66, serve to maintain said gear in true pitch relation with its driving gear 65, during the upward or downward movement of the case 34.

Shaft 67 extending below case 34, is supported in bearing 72, and above said case in bearings 73 and 74, all secured to the frame member 39.

Mounted at the lower end of shaft 67, is the helical gear 75, engaging the helical gear 76, carried by shaft 77 supported in bearings 78 and 79 secured to frame member 39, and carrying at its inner end the continuously moving sprocket roller 16.

Adjacent to gear 76 on shaft 77, a pulley 80, drives by a flexible belt 81, a pulley 82' on shaft 18 carrying the reel 17; through a similar train of gears 82 and 83 at the upper end of shaft 67, a shaft 84 carried by bearings 85 and 86, drives the continuously moving sprocket roller 10, and through the pulley 87 belt 88 and pulley 89 on shaft 8, movement is transmitted to the upper or feed reel 7.

By continuously moving sprocket rollers 10 and 16, it will be understood to mean, continuously moving during the periods of projection and the rewinding of the film strip X.

Rotative movement of the shutter 31 on shaft 32, carried in bearings 90 and 91 in time with the intermittent movement of film X, is imparted through the helical gear 92 on shaft 32 engaging helical gear 93 on shaft 67.

Tension means are provided as hereinbefore stated, to maintain the film strip X flat against the aperture 14' in plate 14, during the projection of a picture, and to release the tension on the film strip during the movement to the next succeeding picture.

As embodied in the construction disclosed, a plate or member 94 forming a part of, or being secured to frame 39, is provided with two guiding strips, 95, 95, which form a channel for the film strip X and a housing for the aperture plate 14.

A gate 96 hinged to member 94 at 97, 97, supports the lamp house 28 and forms a closure for the channel in member 94.

Movably supported in the gate 96, is a rectangular frame member consisting of an upper cross bar 98 and a lower cross bar 99, which support between their ends vertical members 100, and 101, so disposed as to bear, when forced inwardly, on the vertical edges of the film strip X and press it against the aperture plate 14. Pins 102 and 103 secured in cross bars 98 and 99, pass through apertures in the gate 96 and terminate in heads 104 and 105.

Housed in recesses 106 and 107 of gate 96, are compression springs 108 and 109, embracing the pins 102 and 103, and reacting between the inner faces of recesses 106 and 107, and the outer faces of bars 98 and 99, tending normally to press the members 100 and 101 of the tension frame against the film strip X.

Supported on gate 96 by suitable brackets, are two magnets 110 and 111, so disposed as to have their cores, when energized, attract as armatures the heads 104 and 105 of pins 102 and 103; means are provided to prevent the armatures and the cores of the magnets from making metal contact, such as by regulating the tension of springs 108 and 109, or by interposing some non-magnetic cushion between said armatures and said magnet cores, thus eliminating all noise in the operation of the tension device.

Suitable means are provided for exciting the magnets 110 and 111, in time with the movement of the film strip X, to relieve the tension on said film, and as embodied, comprise an insulating cylindrical member 112, mounted on the shaft 67, and carrying a conductor piece 113, designed to form a bridge between the brushes 114 and 115 supported by the insulating block 116 carried by the frame member 39; suitable connections 117, 118 and 118', are provided between the brushes 114 and 115, and the magnets 110 and 111, and a source of electrical energy such as a battery Y.

From the above it will be understood that an electrically operated tension means is provided, which will operate without shock or noise and will be instantaneous in its action.

Figure 1:
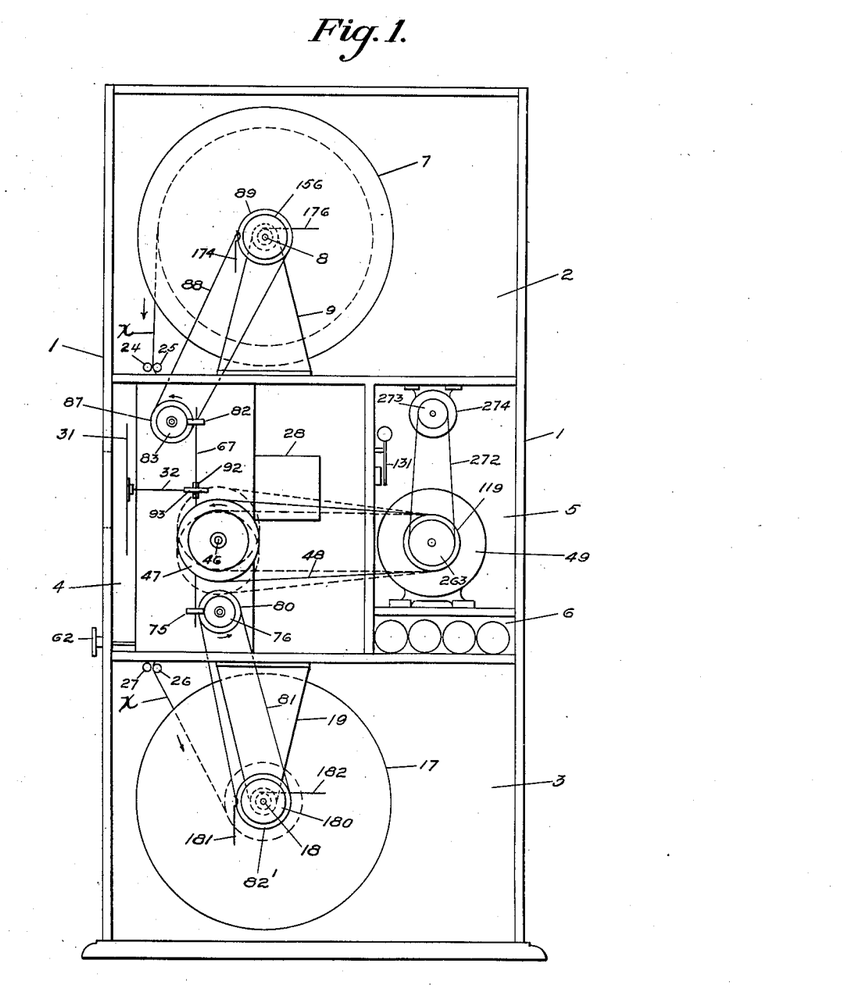
Figure 1. is an elevation showing diagrammatically, the driving side of the machine with its power and light source, the feed and takeup reels, etc., as assembled in its case or housing.
Figure 2:
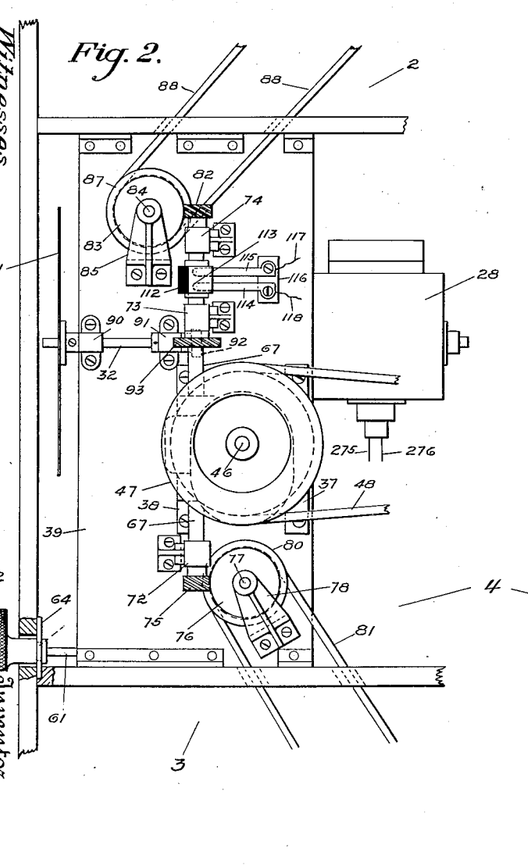
Fig. 2. is an elevation of the machine proper, showing the driving side.
Figure 3:
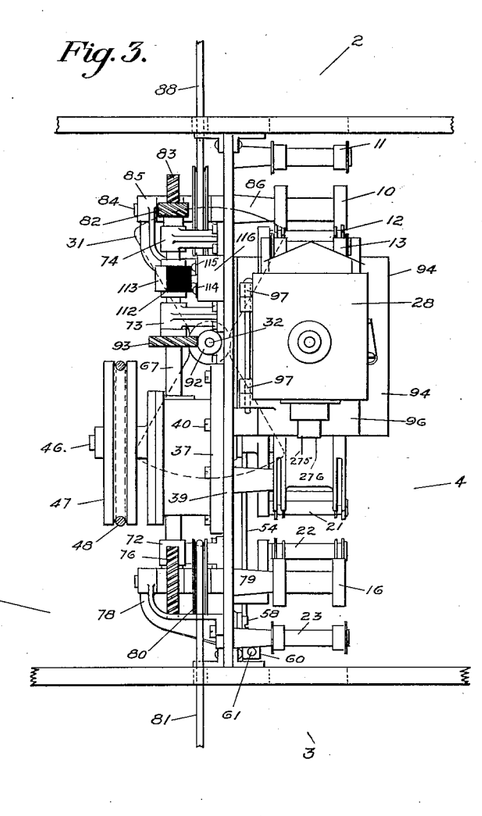
Fig. 3. is an elevation of Fig. 2, as seen from the right.

Automatic means controlled by the unwinding of the film from the reels, and acting independently of the length of film strip contained on either reel 7 or 17, are provided to stop, and to reverse the direction of travel of film strip X, when said film is near or at its end on either of said reels; for example, assume that the upper or feed reel 7, has wound upon it any number of feet of the film strip X up to its capacity, that the film strip is being pulled downward through the machine as indicated by the arrow Fig. 1, at a uniform lineal speed, by the sprocket roller 10; it will be self evident that as the diameter of the film roll on reel 7 decreases, the angular velocity of the reel will increase, and that an increase in centrifugal force will be imparted to any mass rotating about the axis of the reel, by the centrifugal force thus established, electrical contact is made and a circuit closed to energize a magnet and operate a reversing switch controlling the driving motor 49, as hereinafter described.

Referring to Figs. 9, 10, 11, 12, 13, and 14, the driving motor 49 runs continuously, either forward to drive the film strip during projection, or backward during the reversal or rewinding of the film strip X, for the full period that the machine proper is in operation.

Figures 9, 10:
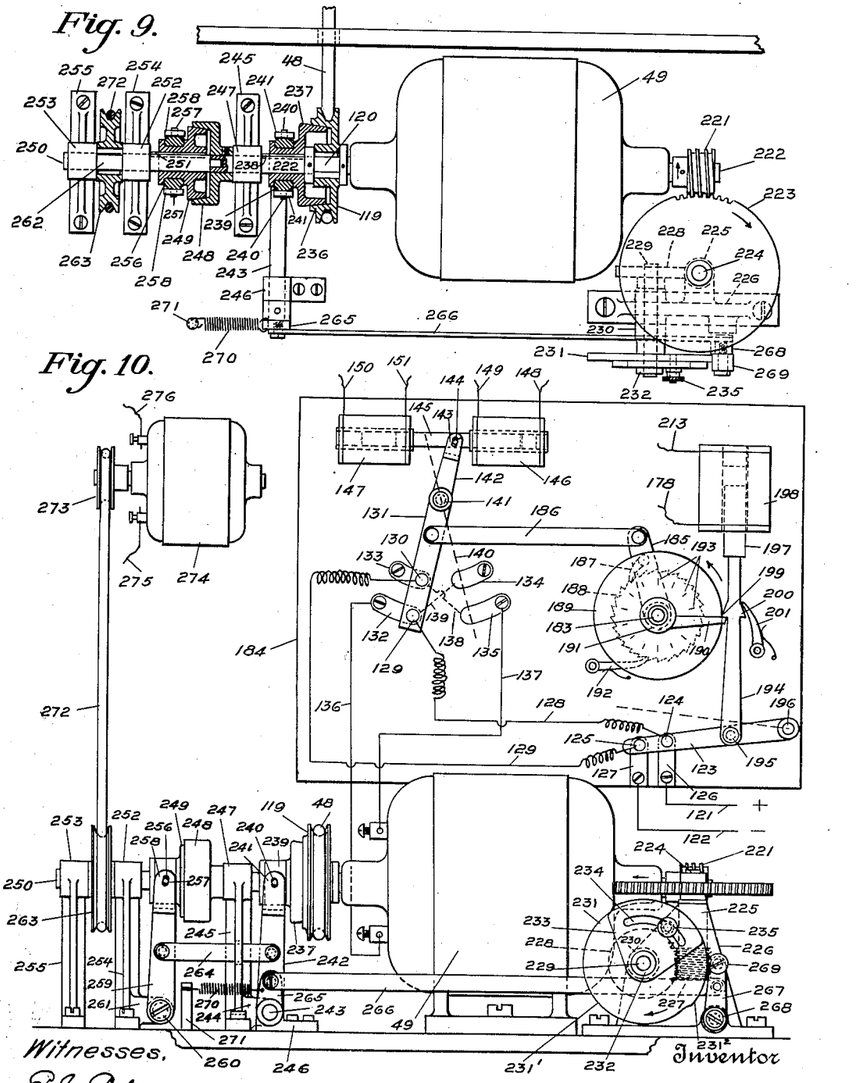
Fig. 9. is a plan view, partly in section, showing the driving source, the intermittent projecting control and the driving means for the light source.
Fig. 10. is an elevation of Fig. 9, showing in addition, a light generating source, the means for reversing the direction of motion of the driving means, and the means for cutting out the driving means.

Pulley 119 mounted on a roller clutch 120, formed on the shaft of motor 49, drives the projecting machine by means of the flexible belt 48 as hereinbefore stated.

Pulley 119, is driven by clutch 120, only when motor 49 is running backward, or during the rewinding of the film strip, and is driven forward intermittently, during the projection of the film strip, by means hereinafter set forth.

Line leads 121 and 122, supply current to the motor 49 through a cutout switch 123, carrying contacts 124 and 125 connecting with the line contacts 126 and 127.

Leads 128 and 129 carry the current from switch 123, to the contacts 129 and 130 of reversing switch 131. Contacts 129 and 130 are so disposed on switch 131, as to complete the circuit to the fields of motor 49, through the leads 136 in connection with contact 132 and 137 connected to contact 135, the cross lead 138 and contact 133, and to cause the motor to be driven in forward rotation.

To reverse the direction of rotation of motor 49, a contact 134 cross connected by lead 139 to contact 132 is provided, and so disposed in relation to contact 135, that switch 131, when in the position shown by dotted line 140, will complete the circuit to the motor fields in the reverse direction of flow from that caused by the full line position of said switch, and cause the motor to rotate in the opposite direction.

Magnetically operated means are provided for shifting the switch arm 131 from the position causing forward rotation of motor 49, to the position causing the reverse rotation of said motor, and vice versa.

Switch arm 131 is pivotally mounted at 141, and has an upwardly extending arm 142, terminating in a yoke 143, engaging by a pin 144, a plunger 145 movably disposed between the two magnets 146 and 147, either of which magnets will draw the plunger 145 within its core, when energized by an electric current, and move the switch arm 131 from one position to the other.

Leads 148 and 149 and leads 150 and 151 from magnets 146 and 147 respectively, have their circuits closed by means hereinafter described in connection with the film reversing means.

Referring now to the centrifugally operated means to reverse the driving motor, and through it the winding and rewinding of the film strip X as hereinbefore outlined; pulley 89 Figs. 11, 12, 13, and 14, is mounted on the shaft 8, rotatively supported in bearings 153 and 154 of standard 9 carrying the film reel 7, the hub of said reel engages a key 155 in shaft 8, and the unwinding of the film from the reel, during the projecting movement of the film, drives shaft 8 in the direction indicated by the arrow; the flexible belt 88 slipping, to compensate for variations in speed between the two pulleys 87 and 89, that is, the reel 7 drives shaft 8 when said reel is being unwound, but on the reverse or rewinding of the film, the shaft 8 is driven by the belt 88 and pulley 89.

Figures 11, 12, 13, 14, 15:
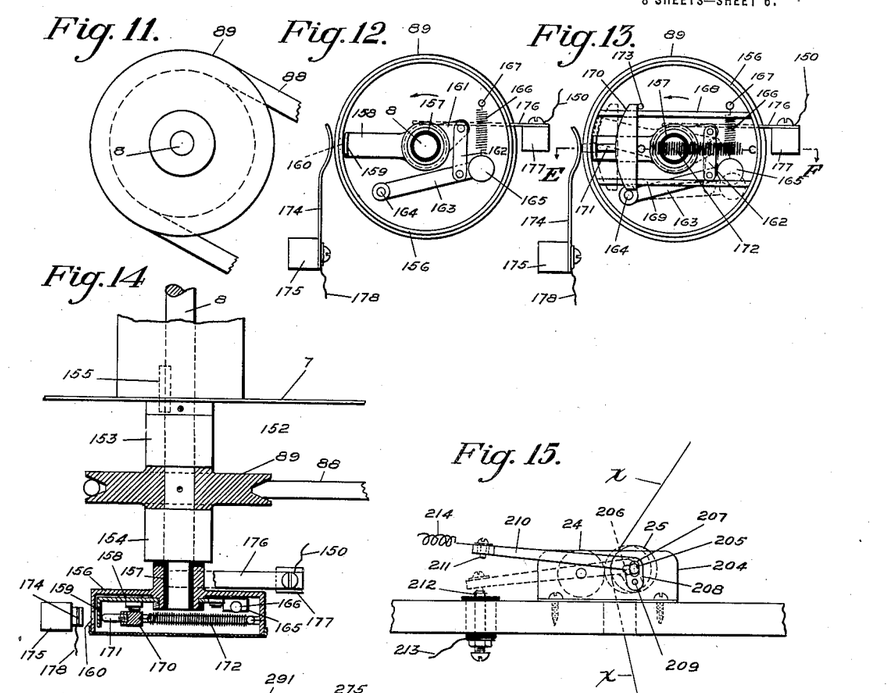
Figs. 11, 12, and 13 are details in the reversing means to cause the rewinding and forward or projecting movement of the film strip.
Fig. 14. is a section on line E. F. of Fig. 13.
Fig. 15. is an elevation of the choke rolls, together with the means for stopping the driving means, in case of breakage of the film strip.

Beyond bearing 154 at the opposite end of shaft 8 from that carrying the reel 7, is mounted a cup shaped or cylindrical member 156, insulated from the shaft 8 by a bushing 157 of any suitable insulating material, such as fiber or hard rubber; pivotally mounted on the internal hub of member 156, adjacent to its inner face, is a lever member 158, extending toward the cylindrical portion of member 156, and provided with an upwardly turned portion or detent 159, adapted to normally cover an aperture 160 in said cylindrical member 156; lever 158 is extended on the opposite side of its pivotal point by the arm 161, which is flexibly connected through the link 162 to lever 163, pivotally supported in member 156 at 164; the opposite end of lever 163 being provided with a weight 165, to which is attached one end of a tension spring 166, the other end of said spring being held by a pin 167 secured in member 156.

Slidably supported on two rods 168 and 169 fixed in the member 156, is the weight 170, having a pin or contact making member 171, adapted normally, to remain within the housing of member 156, partly by the action of spring 172 in tension between said weight and member 156, and in part by the detent 159; the retracted position of weight 170 is limited by a pin or stop 173.

Contact pin 171, is adapted to pass through aperature 160 in member 156, upon the shifting of detent 159 to uncover said aperture, and the overcoming of the tension in spring 172 by the centrifugal force imparted to weight 170.

A brush 174 supported by an insulating block 175, is adapted to make contact with pin 171, when said pin is in its outward or extended position; a second brush 176 supported by an insulating block 177, is continuously in contact with the external hub of member 156.

It will be obvious from the construction disclosed, that the increasing speed of rotation imparted to the shaft 8 and member 156, by the film strip X as it approaches, in unwinding, the hub of reel 7, will cause the increasing centrifugal force imparted to weight 165, to act through its connecting link 162 to rotate lever 158 about its axis, and cause detent 159 to uncover aperture 160; thus allowing weight 170 to assume, due to centrifugal force, its outward or extended position as shown by dotted lines in Fig. 13, causing pin 171 to pass through aperture 160 and make contact with brush 174.

By the contacting of pin 171 with brush 174, a circuit is closed through lead 178, electrical source of energy Y, lead 178, connection 151, the winding of magnet 147 and back through lead 150, brush 176, and member 156 to pin 171.

Magnet 147 being energized will throw the reversing switch 131 to the position indicated by dotted line 140 in Fig. 10, reversing the motor 49 as previously described, and starting the rewinding of the film strip X from the takeup reel 17 onto the upper or feed reel 7.

The fact that, on the rewind of the film upon reel 7, shaft 8 will continue to rotate with sufficient speed to maintain pin 171 in its outward or contacting position for a short period, will only cause a reënergizing of magnet 147 at every revolution of shaft 8, until the speed of said shaft is reduced to a point that will allow spring 172 to retract pin 171 to its inner position, and spring 166 to restore detent 159 to its normal position covering aperture 160.

It will also be apparent, that the machine may be arranged to stop automatically after one projecting movement of the film strip X, by the elimination of contacts 134 and 135, and by connecting lead 137 to the motor 49 through contact 133; and also by means hereinafter set forth.

The various springs and weights in the above described governing or reversing device, may be so adjusted, as to cause a reversal of the switch 131 at any predetermined point in the unwinding of the film strip from the reel; and when so adjusted, will act consistently to cause the switch reversal, independently of the number of feet of film carried by the reel, so long as it is above the minimum diameter of the film roll necessary to effect the action of the governor. Assume, for example, that the governor is adjusted to close the circuit to reverse the driving motor, when the reel has attained a rotative velocity of 200 revolutions per minute; and that the uniform lineal speed of the unwinding film effects this velocity of rotation when the film roll has reached a diameter of one and one half inches. It will be evident from the above that the governor will act consistently at this speed and that the reversal of the driving motor and consequently the direction of motion of the film strip, is dependent upon the rotative velocity of the reel and is not dependent upon the footage of film carried by the reel so long as the amount is above that required to produce a diameter of roll of one and one half inches.

To reverse the direction of travel of the film strip X, when said film has been rewound upon the feed reel 7 and unwound from the takeup reel 17, and to cause it to start another cycle of projection; a similar governor or contact making means 180, to energize magnet 146 and throw switch 131 from the dotted position to the full line position shown in Fig. 10, is provided, and is shown mounted upon the shaft 18 of takeup reel 17, and through the contacts 181 and 182, and leads 148 and 178, and the source of electrical energy Y, lead 178 and connection 149, the circuit necessary to energize said magnet 146 is closed.

Means are provided to effect the cutting off of current from the motor 49 and so stop the operation of the machine, after one, or any predetermined number of cycles of projections of the film strip X have been passed through.

Referring to Fig. 10, the current cutout or machine stopping means as disclosed by the invention, is comprised of a fixed shaft 183 supported by the member 184; rotatively carried by shaft 183 is a lever 185 flexibly connected at its outer end by a link 186 to the reversing switch 131; a pawl 187 carried by lever 185, is adapted to engage the teeth of a ratchet wheel 188, rotatively supported on shaft 183.

Fixed to rotate with ratchet wheel 188, is a plate or disk 189 having an extended hub on which is adjustably mounted an arm or trip member 190, which may be moved about the hub of said disk and clamped in any desired position, by means of the locking nut 191, and which when so locked, will rotate with said disk 189.

As shown in Fig. 10, each two teeth of ratchet wheel 188 correspond to a double movement of the switch arm 131, and a complete projection and rewinding of the film strip, so that a double movement of the said switch will rotate the disk 189 through an arc equal to two teeth of said ratchet, and with it the arm 190, all in the direction indicated by the arrow.

A spring pressed detent 192 prevents backward rotation of the ratchet wheel 188, and suitable marks 193, 193, on the face of disk 189, which correspond to the film travel cycles, provide a ready means for setting the trip 190 for any determined number of cycles for which it is desired that the machine shall operate.

Adjacent to the disk 189 is a vertically disposed member 194, flexibly connected at 195 to the cutout switch arm 123, said arm being pivotally supported at 196 on the plate member 184; member 194 terminates at its upper end in a plunger 197 housed in the core of, and under certain conditions, adapted to be drawn upward by the magnet 198; said member 194 is provided with a projection or stop 199, so disposed as to be engaged and lifted by the trip 190, and a tooth or stop 200 designed to be engaged and held, when in its upward position, by the spring pressed latch 201.

As the cutout mechanism stands in Fig. 10, it will be evident that a double movement of the switch arm 131 will be necessary to effect sufficient movement of the trip 190, to lift member 194 and throw the cutout switch to its dotted line position, and break the circuit to motor 49.

Upon the shutting down of the machine, the feed reel is always left in a fully wound condition, and ready to start projection when current is again supplied to the driving motor.

Means are also provided, in accordance with certain features of the invention, to throw the cutout switch 123 and break the line circuit to the driving motor 49, upon the parting of the film strip X, by fire or by any other cause.

Such means as above referred to are disclosed in Figs. 15 and 10, where 24 and 25 are two choke rolls of the well known type, rotatively supported between two bearing plates 204, 204, one of which is not shown; roll 24 has its axis fixed, while that of roll 25 is slidably as well as rotatively carried in a downwardly inclined slot 206, in each of the plates 204, thus allowing roll 25 to contact with roll 24 when the film strip is not interposed between said rolls.

Shaft 205 of roll 25, is extended beyond one of the plates 204, and engages a slotted aperture in a bell crank lever, one arm of which 208 extends downwardly and is pivoted to plate 204 at 209; the other arm 210 of said lever extends outwardly and supports at its extremity, an insulated contact point 211 adapted to strike, under certain conditions, an adjustably fixed contact point 212.

By the arrangement of the pivotal point 209, and the relative length of arms 208 and 210 of the bell crank lever, it will be seen that a slight movement of the roll 25 will effect a comparatively large movement of the arm 210 and contact point 211.

Either contact 211 or 212 may be so adjusted that the two points will not touch while the film strip is interposed between the rolls 24 and 25.

Normally the tension of the film strip holds the rolls 24 and 25 apart and the arm 210 in the full line position; but when a break occurs in the film strip, and it is no longer interposed between said rolls, roll 25 slides down its inclined bearing slot 206 and contacts with roll 24, arm 210 is moved downward and point 211 is moved from the full line position to the dotted line position, and into contact with point 212.

By the contacting of points 211 and 212, a circuit is closed through lead 213, 214, the source of electrical energy Y, and the lead 178 to the magnet 198; energizing said magnet to lift the plunger 197 and link 194 to throw the cutout switch 123 and break the line circuit to the driving motor 49.

The latch 201 engages tooth 200 of member 194, and prevents the closure of switch 123, when the energizing current is cut off from the magnet 198.

The above described cutout means are interposed between both of the reels 7 and 17, and the continuously moving sprockets 10 and 16 respectively.

In accordance with one feature of the invention, means are provided to interrupt the projection of the film strip upon the screen, during its forward or unwinding movement from the feed reel, causing a period of darkness, which may be less, equal to, or greater than the period of illumination.

A suitable lamp or illuminating means to coöperate with the film and lens, to project the picture upon the screen is provided, and as embodied in the invention, consists of a low voltage filament lamp 220 mounted in the lamp house 28.

Means for effecting the interrupted projection of the film, and to cause the lamp 220 to coördinate with the above mentioned periods of projection and darkness, are controlled by the driving motor 49 as hereinafter set forth.

A worm 221 mounted at one end of shaft 222 of the driving motor 49, meshes with a worm wheel 223 carried on the upper end of shaft 224 supported in bearing 225 of bracket 226; the lower end of shaft 224 carries a worm 227 meshing with a worm wheel 228 mounted on shaft 229 supported in bearing 230 of bracket 226; at the oposite end of said shaft is fixed a cam 231, provided at its circumference with a low portion $231^1$ and a high portion $231^2$; a hub 232 on said cam, supports a rotatively adjustable cam member 233, adapted to be locked to cam 231 through the annular slot 234, by the lock nut 235, the circumferential portion of member 233 corresponding in radius to the high portion $231^2$ of cam 231, is adapted to coincide with or extend said high portion of said cam.

At the opposite end of motor 49 from that carrying the worm 221, the motor shaft 222 is extended and provided with a roller clutch 120 of the well known type, said clutch being designed to engage the hub of pulley 119 and to drive it continuously in the reverse direction only.

Pulley 119 has formed at the inner surface of its rim, one member of a cone clutch 236, adapted to be engaged by the other member 237 of said clutch, which is slidably mounted on, but fixed to rotate with, the shaft 222, by means of the key 238 fixed in said shaft.

Clutch member 237 is provided with a groove in its hub adapted to receive the collar 239. Said collar carries two pins 240, 240, engaging slotted apertures in the arms 241, 241, of yoke lever 242; the lower end of lever 242 is fixed to shaft 243 carried in bearing 244 formed on bracket 245, and in the bearing 246.

Motor shaft 222 is extended through bearing 247 of bracket 245, and terminates in one member 248 of a cone clutch, which is adapted to be engaged by the other member 249 of said clutch; member 249 is slidably mounted on, but caused to rotate with, the secondary shaft 250, by the key 251 fixed in said shaft.

Shaft 222 is counterbored in the end adjacent to shaft 250, and said shaft 250 is provided with a reduced cylindrical portion adapted to fit and rotate in the counterbore of shaft 222.

The extension of shaft 250 beyond clutch member 249, is carried by bearings 252 and 253 of brackets 254 and 255 respectively.

The hub of clutch member 249 is provided with a groove adapted to receive a collar 256, carrying pins 257, 257, engaging slotted apertures in arms 258, 258, of yoke lever 259; the lever 259 is pivotally supported at its lower end 260, on a lug 261 of bracket 254.

Formed on the shaft 250 between bearings 252 and 253, is a roller clutch 262, adapted to engage the hub of a pulley 263 when said shaft is rotated in one direction, and free to turn in said pulley hub when the shaft 250 is rotated in the opposite direction.

Clutch members 237 and 249 are caused to engage and disengage their respective coordinating members 236 and 248, by the action of the yoke levers 242 and 259, which are flexibly joined together by the link 264.

Mounted on shaft 243 beyond bearing 246, is a lever arm 265, flexibly connected at its upper end by a link 266, to a lever 267, pivotally mounted at its lower end 268 to the bearing bracket 226; said lever 267 carries at its upper end a roller 269, adapted to be held continuously in contact with the cam 231, by a spring 270 in tension between lever 265 and post 271; said spring normally tending to rotate shaft 243, and move levers 242 and 259 to disengage clutch members 237 and 249 from their coacting members 236 and 248.

According to one feature of the invention, means are provided for generating current to supply the light source, and as disclosed, a belt 272 driven from the pulley 263 on the shaft 250, drives the pulley 273 on the shaft of a generator 274; the leads 275 and 276 connect said generator with the lamp 220 in lamp house 28.

It will be evident from the reduction gearing shown at the right hand end of motor 49, that any desirable speed of rotation per minute may be imparted to the cam 231 by said motor; such by way of example as one revolution in five minutes, and that one revolution of said cam will govern the engaging of the clutches on the motor shaft 222 and the secondary shaft 250.

It will also be evident, that by a partial rotation of cam member 233 on the hub of cam 231, that the high portion $231^2$ of said cam may be increased or decreased circumferentially, causing a corresponding decrease or increase of the low portion $231^1$, thus varying the proportion of engagement of the roller 269, with the high or low portion of said cam in one revolution.

Through the roller 269 and its connecting mechanism, the high portion $231^2$ of cam 231, controls the engaging, and the low portion $231^1$, the disengaging of the clutch members 237 and 249 with their coacting members 236 and 248 respectively.

The action of the controlling devices above described is as follows; motor 49 when running in one direction, drives the machine for projection of the film strip X, only when the clutch member 236 of pulley 119 is in engagement with clutch member 237; when said clutch members are disengaged, shaft 222 and roller clutch 120 turn freely in the hub of pulley 119, and said pulley remains stationary.

The secondary shaft 250, is driven only upon engagement of the clutch member 248 on shaft 222 with clutch member 249 on said secondary shaft; and the roller clutch 262 engages the hub of pulley 263, only when shaft 250 is rotating with motor shaft 222 in the direction to produce projection of the film strip X, and runs freely in said pulley hub, when said motor shaft rotates to reverse or rewind the film strip, the pulley 263 remaining stationary.

It will be obvious from the above description, that the generator 274 operates to produce current in conjunction with the projection of the film strip, and does not act to produce current during the rewinding of said strip, and that these functions are governed by the cam 231.

While preference is shown in the invention as above disclosed, for a lighting current generated by the machine itself, it is evident that means governed by the driving motor 49, may be employed to cut in or out a current from the line, and that such current may be either of a reduced voltage, for a small incandescent lamp as embodied, or at full line voltage for an incandescent or arc lamp, without departing from the invention.

Figures 16, 17:
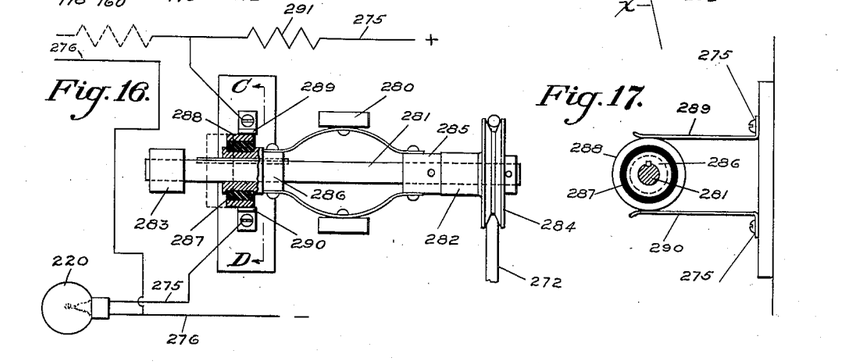
Fig. 16. is an elevation, partly in section, showing means for cutting in or out current for the light source.
Fig. 17. is a sectional view on line C. D. of Fig. 16.

Such lighting means as alluded to above, may be embodied for example, as in Figs. 16 and 17, by any form of switching device driven by the motor 49; such as a governor 280 carried by a shaft 281 supported in bearings 282 and 283, and provided with a pulley 284, which is interposed in place of the pulley 273 of generator 274.

One end of the governor 280 is fixed to the shaft 281 at 285, while its opposite end 286 is slidable along, but rotative with said shaft.

End 286 of said governor 280, is provided with an insulating bushing or ring 287, on which is carried a metallic contacting ring 288, designed to engage and disengage the brushes 289 and 290 in one branch of the line circuit, which may or may not be provided with a resistance 291, according to whether a full line or reduced voltage is desired for the lamp to be used.

Centrifugal force of the governor weights when rotated, draws the free end 286 of the governor inward, in the well known manner, causing ring 288 to contact with brushes 289 and 290, and to close the circuit in one branch of the line 275 leading to the lamp.

Figure 21:
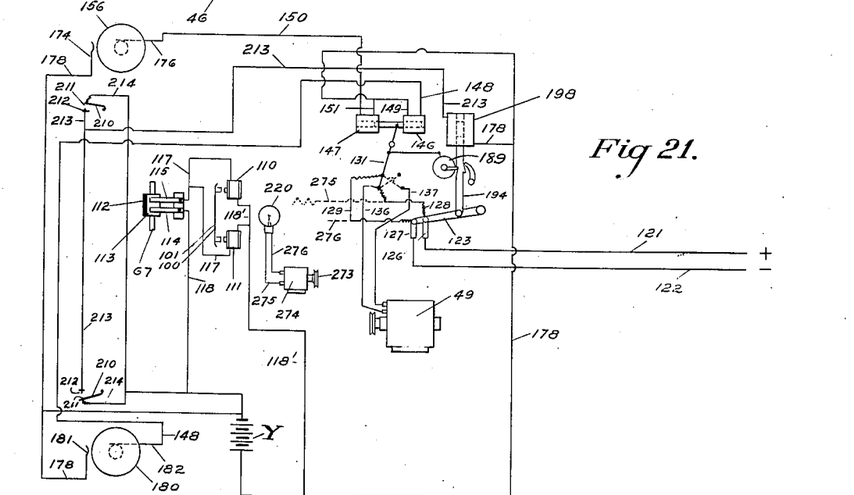
Fig. 21. is a diagrammatic view showing the circuits to the various electrically controlled means, as hereinafter set forth.

It will be understood that the lamp circuit thus controlled, is on the machine side of the cutout switch 123, as indicated in Fig. 21 by dotted lines.

The diagrammatic view, Fig. 21, clearly illustrates the various controlling devices with their wiring circuits; and while for sake of simplicity a battery unit is indicated to energize the different magnets used, it is obvious from the above figure and Fig. 16, that a reduced or full voltage may be taken from the line to energize the magnets.

In accordance with one feature of the invention, means are provided to centralize the film strip X in its travel past the aperture $14^1$, to cause a uniform registration of each succeeding picture in said aperture, and to prevent lateral displacement of the film, with the consequent projection of the film perforations, so often seen upon the screen; said means are also adapted to flatten the film against said aperture and effect a sharper picture on the screen.

Figure 18:
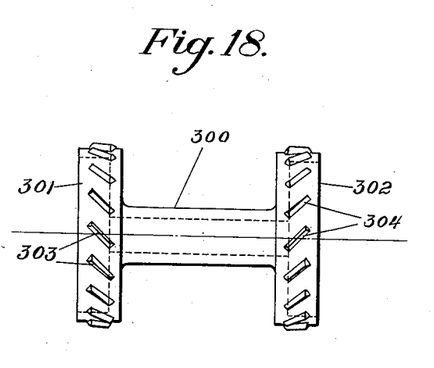
Fig. 18. is an elevation of a film moving sprocket, showing means for centralizing and flattening the film strip.
Figure 19:
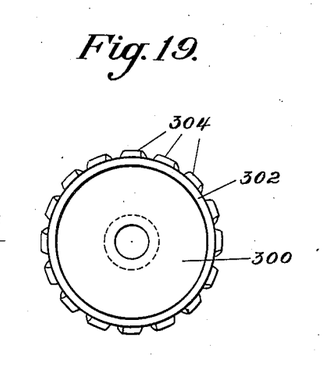
Fig. 19, is an end elevation of Fig. 18.
Figure 20:
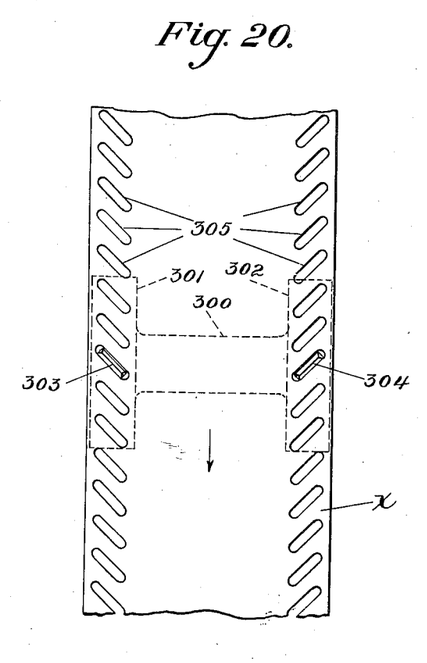
Fig. 20. is an elevation of the film strip with centralizing perforations, in engagement with the centralizing sprocket teeth.

As disclosed in Figs. 18 and 19 and 20, the centralizing means are comprised of a sprocket roller 300, made in the well known form, with two cylindrical ends 301 and 302; said ends are provided respectively, with elongated teeth 303 and 304, which are inclined to the axis of said roller, and may be designated as being portions of interrupted multiple threads; the teeth on end 301 being right hand and those on end 302 being left hand, in their inclination to the axis of said roller.

Correspondingly elongated and inclined slots or perforations 305, are provided in the edges of the film strip, and are adapted to be engaged by the teeth 301, 301, and 302, 302, of the sprocket roller 300.

It will be evident that the wedging action of the teeth 301 and 302 of said sprocket roller in the inclined perforations 305, 305, of the film strip, will centralize said strip and eliminate its lateral movement, as well as act to spread or flatten the film and pre-
vent it from buckling.

Figure 22:
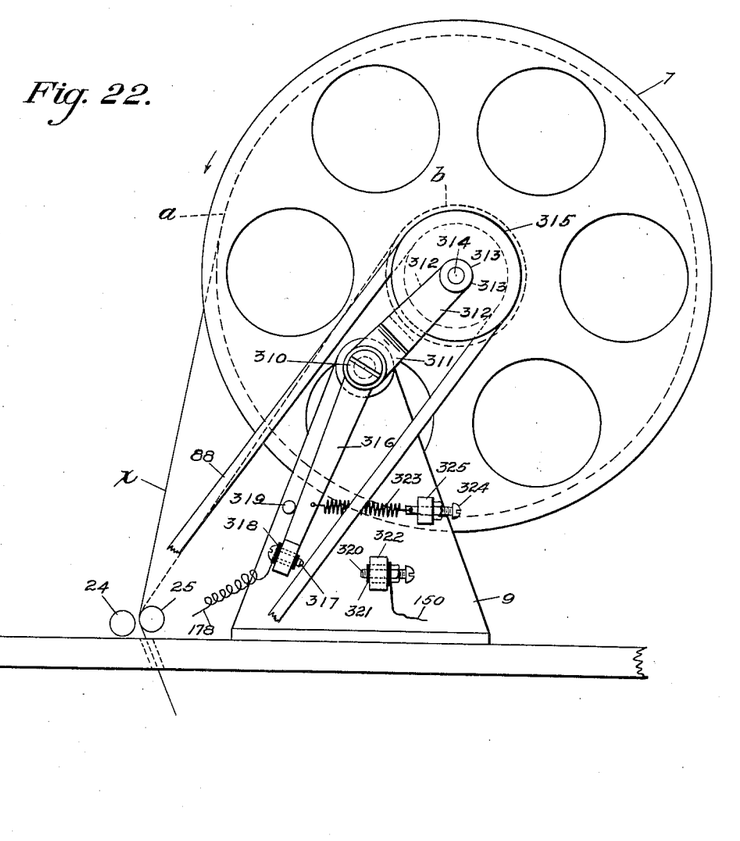
Fig. 22. shows a modified means for effecting the reversal of the machine by the unwinding of the film from the reel.

In Fig. 22 is shown a modification of the means for reversing the machine, when the unwinding of the film strip has reached a predetermined point; said means depend upon the weight of film remaining upon the reel, at the time when reversal of the machine is desired, and obviously would be when the film strip is practically exhausted from the reel.

As disclosed, 9 is a standard, pivotally supporting at 310 a double armed lever, one arm of which 311 extends upwardly, and is forked by the members 312, 312, terminating in bearings 313, 313. which support a shaft 314; carried on said shaft, between the bearings 313, 313, is a pulley 315, connected by a flexible belt 88 to the pulley 87 of the projecting machine. A film reel 7 is fixed to rotate with shaft 314, on an extension of said shaft beyond one of the bearings 313.

During the unwinding of the film strip X from reel 7, the said reel drives the shaft 314 and the pulley 315; any difference in speed between said pulley and belt 88 being compensated for, by a slippage between the two. During the rewinding of the film strip X upon the reel 7, pulley 315 drives shaft 314 and said reel.

Extending downwardly from the pivotal point 310 of standard 9, the arm 316 of the double armed lever, is provided with a contact point 317 mounted in an insulating bushing 318 in the end of said arm. A stop 319 supported on the standard 9, limits the movement of the arm 316, in the direction in which it is forced by the weight of the film and the reel 7.

A contact point 320 insulated by bushing 321 in lug 322 of standard 9, is adapted to contact with the point 317 under certain conditions of weight of the film and reel 7. A tension spring 323 fixed at one end to lever arm 316, and at the opposite end to an adjustable pin 324 in lug 325 of standard 9, reacts against the weight of the film and reel 7.

It will be evident from the structure disclosed, that when the reel 7 is fully wound with the film strip X, as indicated at a, that the weight of the film and reel will maintain the arm 316 against the stop 319; and that the spring 323 may be so proportioned or adjusted, as to overcome the weight of the film and the reel, when the film has been reduced by unwinding to any determined point, as at b, and thus cause the points 317 and 320 to contact.

By the contacting of points 317 and 320, a circuit is closed to energize the magnet 147, as hereinbefore described, and throw switch 131 to reverse the driving motor 49.

It will be understood from the foregoing, that devices have been provided realizing the objects and advantages herein pointed out, together with other objects and advantages.

It will be further understood, that many changes may be made from the precise form of such devices herein shown and described, within the accompanying claims, without departing from the principles of the invention and without sacrificing its objects and advantages.

I claim:

1. In a motion picture projecting machine, a movable film strip, a variably rotating reel upon which said strip is wound or unwound and means to stop the rotation of and said reel actuated by the change in rate of rotation of said reel.

2. In a motion picture projecting machine, a movable film strip, a variably rotating reel upon which said strip is wound or unwound, and means governed by the increasing rotative velocity of said reel to stop the rotation of said reel.

3. In a motion picture projecting machine, a movable film strip, a variably rotating reel upon which said strip is wound or unwound and means governed by the change in rate of rotation of said reel to reverse the direction of rotation of said reel.

4. In a motion picture projecting machine, a rotatable reel, a film strip wound upon said reel, rotation being imparted to said reel by the unwinding of said strip and magnetically operated means governed by the rotation of the reel to stop the rotation of said reel.

5. In a motion picture projecting machine, a rotatable reel, a film strip wound upon said reel, rotation being imparted to said reel by the unwinding of said film strip and magnetically operated means governed by the rotation of the reel to reverse the direction of rotation of said reel.

6. In a motion picture projecting machine, a rotatable reel, a film strip wound upon said reel, rotation being imparted to said reel by the unwinding of said strip and magnetically operated means governed by the rotation of the reel to stop the unwinding of said film.

7. In a motion picture projecting machine, a rotatable reel, a film strip wound upon said reel, rotation being imparted to said reel by the unwinding of said film strip, magnetically operated means governed by the rotation of said reel to reverse the direction of movement of said film strip.

8. In a motion picture projecting machine, a movable film strip, a rotating reel upon which said strip is wound or unwound and centrifugally operated means actuated by the rotation of said reel to reverse the direction of rotation of said reel.

9. In a motion picture projecting machine, a movable film strip, a rotating reel upon which said strip is wound or unwound, centrifugal means operated by the rotation of said reel and magnetic means governed by said centrifugal means to reverse the direction of rotation of said reel.

10. In a machine of the nature described, a film driving means and centrifugally operated means controlled by the unwinding of the film to reverse said driving means.

11. In a machine of the nature described, a film driving means and centrifugally and magnetically operated means controlled by the unwinding of the film, to reverse said driving means.

12. In a motion picture projecting machine, a rotatable reel carrying a film strip wound thereon, driving means for said reel, a governor operated by the unwinding of said film strip from said reel and magnetic means controlled by said governor to reverse said driving means.

13. In a motion picture projecting machine, a rotatable reel carrying a film strip wound thereon, driving means for said reel, a switch controlling said driving means, magnets to operate said switch and means controlled by the unwinding of the film from said reel to energize said magnets.

14. In a machine of the nature described, a film strip, a film reel, driving means, means driven by said driving means to effect alternate periods of intermittent movement and of rest when said film is unwinding from said reel, means to reverse the movement of the film strip governed by the change in rate of rotation of the reel and means to cause a continuous rewinding of the film upon said reel when the film is traveling in the reverse movement.

15. In a motion picture projecting machine, a driving motor, a switch controlling said motor, a magnet having a plunger pivotally connected to said switch, a circuit for said magnet, a roller, a circuit closing lever actuated by said roller and a film strip passing over said roller and causing the roller to normally hold said lever in an open circuit position and allow said lever to come to a circuit closing position and energize said magnet to positively operate said switch and stop said motor upon the parting or running out of said film.

16. In a motion picture projecting machine, a driving motor, a light source controlled by said motor, a switch controlling said motor, a magnet having a plunger pivotally connected to said switch, a circuit for said magnet, a roller, a circuit closing lever actuated by said roller and a film strip passing over said roller and causing said roller to normally hold said lever in an open circuit position and allow said lever to come to a closing circuit position and energize said magnet to positively operate said switch and cut out said motor and said light upon the parting or running out of said film.

17. In a motion picture projecting machine, a film, driving means and means controlled by said driving means to effect alternate periods of intermittent movement and of rest of said film.

18. In a machine of the nature described, a film, driving means and a one way clutch controlled by said driving means to effect a continuous movement of said film.

19. In a machine of the nature described, a film, a reel, driving means, means controlled by said driving means to effect alternate periods of projection and of rest of the film when unwinding from said reel and a one way clutch controlled by said driving means to cause a continuous rewinding of the film on said reel.

20. In a machine of the nature described, a film, a source of light, driving means and means controlled by said driving means to effect alternate periods of projection and of rest of said film and to control said light in harmony with said periods of projection.

21. In a machine of the nature described, a film, a source of light, driving means, means controlled by said driving means to effect alternate periods of projection and of rest of said film when traveling in one direction and the control of said light in harmony with said periods of projection and means to reverse the travel of said film.

22. In a machine of the nature described, a film, a source of light, driving means, means controlled by said driving means to effect alternate periods of projection and of rest of said film when traveling in one direction and the control of said light in harmony with said periods of projection and means to reverse the travel of said film and cause a continuous movement in said reverse direction.

23. In a motion picture projecting machine, a source of light, driving means, a cam operated by said driving means and a clutch actuated by said cam to control said source of light.

24. In a machine of the nature described, driving means, a switch controlling said driving means, a ratchet disk to operate said switch, a film, a reel and means controlled by the unwinding of the film from said reel to move said ratchet disk.

25. In a machine of the nature described, driving means, a switch controlling said driving means, a ratchet disk to operate said switch, a film, a reel, means controlled by the unwinding of the film from said reel to move said disk and settable means on said disk to cause said disk to operate said switch for any predetermined number of unwindings of the film from said reel.

26. In a machine of the nature described, driving means, a switch controlling said driving means, a ratchet disk to operate said switch, a film, a reel, means controlled by the unwinding of the film from said reel to move said disk and settable means on said disk to cause said disk to operate said switch and stop said motor for any predetermined number of unwindings of said film from said reel.

27. In a motion picture projecting machine, driving means, a switch controlling said driving means, a film, a reel and a centrifugal governor controlled by the unwinding of the film from said reel to cause the operation of said switch.

28. In a motion picture projecting machine, driving means, a switch controlling said driving means, a film, a reel and a centrifugal governor controlled by the unwinding of the film from said reel to cause the operation of said switch and stop and reverse said driving means.

29. In a motion picture projecting machine, a film, driving means and means controlled by said driving means to effect alternate periods of intermittent movement and of rest of said film, and means to vary the ratio of time of movement to time of rest in said periods.

In testimony whereof, I have signed my name to this specification, in the presence of two subscribing witnesses.

JOHN DARBY.

Witnesses:
  E. S. ECKARDT,
  HERMAN F. CUNTZ.